US008388922B2

(12) United States Patent
Sotowa et al.

(10) Patent No.: US 8,388,922 B2
(45) Date of Patent: Mar. 5, 2013

(54) NEGATIVE ELECTRODE MATERIAL FOR LITHIUM BATTERY, AND LITHIUM BATTERY

(75) Inventors: Chiaki Sotowa, Kanagawa (JP); Masataka Takeuchi, Kanagawa (JP); Hidekazu Mori, Tokyo (JP); Masahiro Yamakawa, Tokyo (JP)

(73) Assignees: Showa Denko K.K., Tokyo (JP); Zeon Corporation, Tokyo (JP)

( * ) Notice: Subject to any disclaimer, the term of this patent is extended or adjusted under 35 U.S.C. 154(b) by 0 days.

(21) Appl. No.: 13/089,588

(22) Filed: Apr. 19, 2011

(65) Prior Publication Data

US 2011/0193014 A1 Aug. 11, 2011

Related U.S. Application Data

(62) Division of application No. 10/585,205, filed as application No. PCT/JP2004/019835 on Dec. 28, 2004, now abandoned.

(60) Provisional application No. 60/534,989, filed on Jan. 9, 2004.

(30) Foreign Application Priority Data

Jan. 5, 2004 (JP) ................................ 2004-000254

(51) Int. Cl.
H01M 4/04 (2006.01)
H01M 4/583 (2010.01)
H01M 4/62 (2006.01)

(52) U.S. Cl. ................ 423/445 R; 429/231.8; 29/623.1; 29/623.5

(58) Field of Classification Search .............. 423/445 R; 429/231.8; 29/623.1, 623.5
See application file for complete search history.

(56) References Cited

U.S. PATENT DOCUMENTS

| 5,631,100 | A | 5/1997 | Yoshino et al. |
|---|---|---|---|
| 5,658,691 | A | 8/1997 | Suzuki et al. |
| 5,721,433 | A | 2/1998 | Kosaka |
| 6,037,095 | A | 3/2000 | Miyasaka |
| 6,403,259 | B1 | 6/2002 | Kitagawa et al. |
| 6,998,192 | B1 | 2/2006 | Yumoto et al. |
| 2002/0053131 | A1 * | 5/2002 | Hikmet ........................ 29/623.1 |

FOREIGN PATENT DOCUMENTS

| CN | 1032042 A | 3/1989 |
|---|---|---|
| CN | 1227004 A | 8/1999 |
| EP | 0 917 228 A1 | 5/1999 |
| EP | 1478039 A2 | 11/2004 |
| JP | 4-155776 A | 5/1992 |
| JP | 4-237971 A | 8/1992 |
| JP | 09007597 A * | 1/1997 |
| JP | 09-213335 A | 8/1997 |
| JP | 11162451 A * | 6/1999 |
| JP | 11-176442 A | 7/1999 |
| JP | 2000-149951 | 5/2000 |
| JP | 2000-199131 A | 7/2000 |
| JP | 2000-340232 A | 12/2000 |
| JP | 2001-76726 | 3/2001 |
| JP | 2003-068301 A | 3/2003 |
| JP | 2003-168429 | 6/2003 |
| JP | 2003-173778 | 6/2003 |
| JP | 2003-226510 | 8/2003 |
| JP | 2003-227039 | 8/2003 |
| JP | 2003-249220 | 9/2003 |
| JP | 2005-4974 A | 1/2005 |
| KR | 1995-7003212 A | 8/1995 |
| KR | 2000-0023090 A | 4/2000 |
| KR | 2001-0110680 | 12/2001 |
| KR | 2003-0033492 | 5/2003 |
| WO | 95/00977 | 1/1995 |
| WO | 00/58536 | 10/2000 |
| WO | 03/028128 A2 | 4/2003 |

OTHER PUBLICATIONS

Performance Binder for Lithium Ions, Advanced Battery Technology, Feb. 2003, one page.

* cited by examiner

Primary Examiner — Gregg Cantelmo
(74) Attorney, Agent, or Firm — Sughrue Mion, PLLC

(57) ABSTRACT

The present invention relates to a negative electrode material for a lithium battery comprising a carbonaceous negative electrode active substance having a specific surface area of 1 $m^2/g$ or more, a binder formed of styrene-butadiene rubber and a carbon fiber having a fiber diameter of 1 to 1,000 nm; and to a lithium battery using the negative electrode material, which has excellent characteristics, i.e., low electrode resistance, high electrode strength, excellent electrolytic solution permeability, high energy density, and good high-speed charging/discharging performance. The negative electrode material contains carbon fiber in the amount of 0.05 to 20 mass % and the binder formed of styrene-butadiene rubber in 0.1 to 6.0 mass %, and may further contain a thickener such as carboxymethyl cellulose in the amount of 0.3 to 3 mass %.

4 Claims, No Drawings

NEGATIVE ELECTRODE MATERIAL FOR LITHIUM BATTERY, AND LITHIUM BATTERY

CROSS REFERENCE TO THE RELATED APPLICATIONS

This application is a Rule 53(b) Divisional of U.S. application Ser. No. 10/585,205 filed May 23, 2007 (now abandoned), which is a 371 of PCT Application No. PCT/JP2004/019835 filed Dec. 28, 2004, which claims benefit to Provisional Application No. 60/534,989 filed Jan. 9, 2004 and Japanese Patent Application No. 2004-00254 filed Jan. 5, 2004. The above-noted applications are incorporated herein by reference in their entirety.

TECHNICAL FIELD

The present invention relates to a carbonaceous negative electrode material for producing a lithium battery having high volumetric charge/discharge capacity, and exhibiting excellent characteristics in terms of the charge/discharge cycle and large-current load; to a composition for forming the negative electrode material (hereinafter may be referred to as a "negative electrode material composition"); to a method for producing the composition; to a lithium battery and a lithium secondary battery employing the carbonaceous negative electrode material.

BACKGROUND ART

With the progress of small-size, lightweight and high-performance portable apparatuses, increasing demand has arisen for a secondary battery having high energy density; i.e., high capacity. In view of this tendency, a number of small-sized portable apparatuses such as cellular phones and video cameras have employed a non-aqueous lithium secondary battery such as a lithium ion battery employing a non-aqueous electrolytic solution or a lithium polymer battery, which exhibits high energy density and high voltage. Such a lithium secondary battery employs, as a negative electrode material, a carbon material such as graphite, which exhibits high charge/discharge capacity per unit mass at low electric potential nearly equal to that of lithium (Li). However, such an electrode material employed in the battery exhibits a gravimetric charge/discharge capacity nearly equal to the theoretical value, and thus the gravimetric energy density of the battery is approaching its limit. Therefore, attempts have been made to reduce the amounts of an electrode binder and an electrically conductive additive, which do not contribute to discharge capacity, so as to enhance the efficiency of the electrode.

Conventionally, fluorine-containing resins such as polyvinylidene fluoride (abbreviated as "PVDF") and copolymers thereof have generally been employed as a binder for a negative electrode. However, recently, styrene-butadiene rubber (abbreviated as "SBR") has been widely employed as a binder for a negative electrode, for such reasons that SBR can be added in a reduced amount to a negative electrode material, and SBR, which is used in the form of aqueous dispersion, enables to simplify an electrode production process.

Meanwhile, as an electrically conductive additive, there has been widely employed vapor grown carbon fiber, which exhibits high electrical conductivity and exerts the effect of enhancing the strength of an electrode, as compared with the case of carbon black (e.g., acetylene black), which has conventionally been employed as an electrically conductive additive. For example, Japanese Patent Laid-Open Publication (kokai) No. 4-155776 and Japanese Patent Laid-Open Publication (kokai) No. 4-237971 disclose a technique in which vapor grown carbon fiber (VGCF) is added to a graphite negative electrode, whereby the resistance of the electrode is lowered, the strength and expansion/shrinkage resistance of the electrode are enhanced, and the load characteristics and cycle life of the resultant lithium secondary battery are improved.

In the above conventional technique, vapor grown carbon fiber, which exhibits hydrophobicity, is employed in combination with PVDF as a binder, which is used in the form of organic solvent dispersion, but is not employed in combination with SBR, which is used in the form of aqueous dispersion.

A secondary battery employed in a small-sized portable apparatus is required to have a smaller size, high gravimetric energy density and high volumetric energy density. Therefore, attempts have been made to increase the amount of an electrode material charged into a battery housing by increasing the density of the electrode material, wherein charge/discharge capacity is nearly equal to the theoretical value as described above, so as to enhance the volumetric energy density of the resultant electrode and battery.

Graphite, which is at present most widely employed as a negative electrode material, has a true density of about 2.2 g/cm$^3$, but graphite has conventionally been employed in a negative electrode having a density of about 1.5 g/cm$^3$. When the density of the negative electrode employing graphite is increased to 1.7 g/cm$^3$ or higher, conceivably, the volumetric energy density of the resultant battery can be enhanced. However, when the density of a negative electrode is increased, the amount of pores contained in the negative electrode is reduced, leading to problems such as deficiency of an electrolytic solution, which is generally present in the pores and plays an important role for electrode reaction, and lowering of the rate of permeation of the electrolytic solution into the negative electrode. When the amount of the electrolytic solution in the negative electrode is insufficient, the electrode reaction proceeds at a lower rate, resulting in lowering of energy density and high-speed charging/discharging performance. Meanwhile, when the electrolytic solution permeability is impaired, longer time is required for producing a battery, leading to an increase in production cost. Such problems become more pronounced in the case of a lithium polymer battery, which employs a polymer electrolytic solution of high viscosity.

DISCLOSURE OF THE INVENTION

An object of the present invention is to provide a carbonaceous negative electrode material of high energy density, which is required for producing a lithium battery of high energy density exhibiting excellent cycle characteristics and high-speed charging/discharging performance.

In order to solve the aforementioned problems involved in a carbonaceous negative electrode material, the present inventors have conducted extensive studies, and as a result have found that when SBR, which exhibits bindability even in a relatively small amount, is added as a binder to a carbonaceous negative electrode material, and carbon fiber having a fiber diameter of 1 to 1,000 nm, serving as an electrically conductive additive, is uniformly dispersed in the negative electrode material, the resultant battery exhibits excellent characteristics; i.e., low electrode resistance, high electrode strength, high electrolytic solution permeability, high energy density and good high-speed charging/discharging performance. The present invention has been accomplished on the basis of this finding.

Accordingly, the present invention provides a negative electrode material for a lithium battery (hereinafter may be referred to as a "carbonaceous negative electrode material for a lithium battery"), and a producing method and use thereof as described below.

1. A negative electrode material for a lithium battery characterized by comprising a carbonaceous negative electrode active substance having a specific surface area of 1 m$^2$/g or more, a binder formed of styrene-butadiene rubber and a carbon fiber having a fiber diameter of 1 to 1,000 nm.
2. The negative electrode material for a lithium battery according to 1 above, wherein the binder formed of styrene-butadiene rubber is in the form of fine particles having an average particle size of 10 to 500 nm.
3. The negative electrode material for a lithium battery according to 1 or 2 above, wherein the amount of the carbon fiber is 0.05 to 20 mass % and the amount of the binder formed of styrene-butadiene rubber is 0.1 to 6.0 mass %, on the basis of the total amount of the carbonaceous negative electrode active substance, the binder, and the carbon fiber.
4. The negative electrode material for a lithium battery according to any one of 1 to 3 above, which further comprises a thickener.
5. The negative electrode material for a lithium battery according to 4 above, wherein the amount of the thickener is 0.1 to 4 mass % on the basis of the total amount of the carbonaceous negative electrode active substance, the binder, the carbon fiber and the thickener.
6. The negative electrode material for a lithium battery according to 4 above, wherein the thickener is carboxymethyl cellulose.
7. The negative electrode material for a lithium battery according to any one of 1 to 6 above, wherein a negative electrode formed of the electrode material exhibits a specific resistance of 0.5 Ωcm or less at 25° C.
8. The negative electrode material for a lithium battery according to any one of 1 to 7 above, wherein the carbon fiber is a graphite carbon fiber which has undergone thermal treatment at 2,000° C. or higher.
9. The negative electrode material for a lithium battery according to any one of 1 to 7 above, wherein the carbon fiber is a graphite carbon fiber having a surface to which an oxygen-containing functional group has been introduced through oxidation treatment.
10. The negative electrode material for a lithium battery according to any one of 1 to 7 above, wherein the carbon fiber is a graphite carbon fiber containing boron in an amount of 0.1 to 100,000 ppm.
11. The negative electrode material for a lithium battery according to 8 above, wherein the graphite carbon fiber has an average interlayer distance ($d_{002}$) of a (002) plane of 0.344 nm or less as measured by X-ray diffractometry.
12. The negative electrode material for a lithium battery according to any one of 1 to 11 above, wherein the carbon fiber has a structure with a hollow space.
13. The negative electrode material for a lithium battery according to any one of 1 to 12 above, wherein the carbon fiber contains a branched carbon fiber.
14. The negative electrode material for a lithium battery according to any one of 1 to 13 above, wherein the carbonaceous negative electrode active substance contains Si.
15. The negative electrode material for a lithium battery according to any one of 1 to 14 above, wherein the carbonaceous negative electrode active substance is a non-graphite carbon material, and the layer of the compound comprising a negative electrode active substance, binder and electrically conductive additive exhibits a bulk density of 1.5 g/cm$^3$ or more.
16. The negative electrode material for a lithium battery according to any one of 1 to 15 above, wherein, before the electrode material is formed into an electrode, the carbonaceous negative electrode active substance is in the form of carbonaceous particles satisfying the following requirements:
(1) average roundness as measured by use of a flow particle image analyzer is 0.70 to 0.99; and
(2) average particle size as measured by laser diffractometry is 1 to 50 μm.
17. The negative electrode material for a lithium battery according to any one of 1 to 16 above, wherein the carbonaceous negative electrode active substance contains a graphite carbonaceous material in an amount of 50 mass % or more
18. The negative electrode material for a lithium battery according to 17 above, wherein the graphite material contains 0.20 boron.
19. The negative electrode material for a lithium battery according to any one of 1 to 18 above, wherein, before the electrode material is formed into an electrode, the carbonaceous negative electrode active substance is in the form of carbonaceous particles containing, in an amount of 50 mass % or more, graphite particles satisfying the following requirements:
(1) average roundness as measured by use of a flow particle image analyzer is 0.70 to 0.99; and
(2) average particle size as measured by laser diffractometry is 1 to 50 μm.
20. The negative electrode material for a lithium battery according to 17 above, wherein the graphite carbonaceous material is in the form of carbonaceous particles containing, in an amount of 50 mass % or more, graphite particles satisfying the following requirements:
(1) $C_0$ of a (002) plane as measured by X-ray diffractometry is 0.6900 nm or less, La (the size of a crystallite as measured along the a-axis) is greater than 100 nm, and Lc (the size of a crystallite as measured along the c-axis) is greater than 100 nm;
(2) specific surface area is 1.0 to 10 m$^2$/g;
(3) true density is 2.20 g/cm$^3$ or more; and
(4) laser Raman R value (the ratio of the intensity of a peak at 1,360 cm$^{-1}$ in a laser Raman spectrum to that of a peak at 1,580 cm$^{-1}$ in the spectrum) is 0.01 to 0.9.
21. The negative electrode material for a lithium battery according to 15 above, wherein the layer of the compound comprising a negative electrode active substance, binder and electrically conductive additive exhibits a bulk density of 1.7 g/cm$^3$ or more.
22. A method for producing a composition for forming a 0.20 negative electrode material for a lithium battery, comprising adding an aqueous styrene-butadiene rubber dispersion to a carbon fiber/active substance dispersion prepared by dispersing, in an aqueous thickener solution, a carbon fiber having a fiber diameter of 1 to 1,000 nm, a carbonaceous negative electrode active substance having a specific surface area of 1 m$^2$/g or more; and stirring the resultant mixture.
23. The method for producing a composition for forming a negative electrode material for a lithium battery according to 22 above, wherein the carbon fiber/active substance dispersion is prepared by dispersing a carbon fiber having a fiber diameter of 1 to 1,000 nm in an aqueous thickener solution under stirring; and by adding thereto a carbonaceous negative electrode active substance having a specific surface area of 1 m²/g or more followed by mixing with stirring.

24. The method for producing a composition for forming a negative electrode material for a lithium battery according to 22 above, wherein the carbon fiber/active substance dispersion is prepared by dispersing a carbon fiber having a fiber diameter of 1 to 1,000 nm in an aqueous thickener solution under stirring; by adding thereto a carbonaceous negative electrode active substance having a specific surface area of 1 m²/g or more followed by mixing with stirring; and by being regulated using an aqueous thickener solution.

25. The method for producing a composition for forming a negative electrode material for a lithium battery according to 22 above, wherein the carbon fiber/active substance dispersion is prepared by adding, to an aqueous thickener solution, a carbonaceous negative electrode active substance having a specific surface area of 1 m²/g or more followed by mixing with stirring; and by dispersing a carbon fiber having a fiber diameter of 1 to 1,000 nm in the resultant mixture under stirring.

26. The method for producing a composition for forming a negative electrode material for a lithium battery according to 22 above, wherein the carbon fiber/active substance dispersion is prepared by dry-mixing a carbon fiber having a fiber diameter of 1 to 1,000 nm with a carbonaceous negative electrode active substance having a specific surface area of 1 m²/g or more to thereby disperse the carbon fiber in the resultant mixture; and by adding an aqueous thickener solution to the resultant mixture, followed by mixing with stirring.

27. The method for producing a composition for forming a negative electrode material for a lithium battery according to any one of 22 to 26 above, wherein the content of the thickener in the aqueous thickener solution is 0.3 to 5 mass %, and the content of the styrene-butadiene rubber in the aqueous styrene-butadiene rubber dispersion is 10 to 60 mass %.

28. The method for producing a composition for forming a negative electrode material for a lithium battery according to any one of 22 to 27 above, wherein the thickener is carboxymethyl cellulose.

29. A composition for forming a negative electrode material for a lithium battery, which composition is produced by means of a method as recited in any one of 22 to 28 above.

30. A composition for forming a negative electrode material for a lithium battery, which composition comprises an aqueous thickener solution, wherein carbon fiber having a fiber diameter of 1 to 1,000 nm is dispersed.

31. The composition for forming a negative electrode material for a lithium battery according to 30 above, wherein the content of the thickener in the aqueous thickener solution is 0.3 to 5 mass %, and the amount of the carbon fiber is 0.1 to 10 mass % on the basis of the entirety of the composition.

32. The composition for forming a negative electrode material for a lithium battery according to 30 or 31 above, wherein the thickener is carboxymethyl cellulose.

33. The negative electrode material for a lithium battery according to any one of 1 to 21 above, which is produced by applying the composition for forming the negative electrode material for a lithium battery as recited in 29 above onto a metallic collector foil, and drying the thus-applied composition, followed by pressure molding.

34. The negative electrode material for a lithium battery according to 33 above, wherein the metallic collector foil is a copper foil or copper alloy foil having a thickness of 1 to 50 μm.

35. A lithium battery comprising the negative electrode material for a lithium battery as recited in any of 1 to 21, 33 and 34 above.

36. A lithium secondary battery comprising the negative electrode material for a lithium battery as recited in any of 1 to 21, 33 and 34 above.

37. The lithium secondary battery according to 36 above, which comprises a non-aqueous electrolyte and a non-aqueous solvent for the non-aqueous electrolyte, which is at least one species selected from the group consisting of ethylene carbonate, diethyl carbonate, dimethyl carbonate, methyl ethyl carbonate, propylene carbonate, butylene carbonate and vinylene carbonate.

The present invention will next be described in detail.

1. Carbon Fiber

In general, a carbonaceous negative electrode material is produced by wet-mixing carbonaceous electrode active substance powder (average powder particle size: several to some tens of μm) with a binder and an electrically conductive additive, and uniformly applying the resultant mixture onto a metallic collector coil, followed by drying and pressure molding.

Conventionally, carbon black powder (e.g., acetylene black powder) has generally been employed as an electrically conductive additive. However, adding an electrically conductive additive which has a high aspect ratio (e.g., carbon fiber) to the electrode enables to form a network throughout the electrode, and to enhance the electrical conductivity viewed in the entire electrode even when only a small amount of the conductivity additive is added. In general, in the case of carbon black, an amount of about 5 mass % is required based on the total amount of a carbonaceous negative electrode active substance, binder and electrically conductive additive for enhancement of the electrical conductivity of an electrode. In contrast, in the case of electrically conductive fiber having a high aspect ratio, such as vapor grown carbon fiber, even when the amount thereof added to an electrode is 3 mass % or less (e.g., 1 mass %), the fiber exhibits its effects sufficiently. As described above, since the energy density of a battery employing a carbonaceous electrode active substance is approaching its limit, in order to increase the volumetric energy density of the battery, attempts have been made to increase the density of an electrode employed therein. However, in the case where a conventional carbon black electrically conductive additive is employed, when the density of an electrode is increased through molding (high-pressure pressing), the electrode is deformed, resulting in damage to electrically conductive paths or electrolytic solution permeation paths formed in the electrode. In contrast, since carbon fiber is not to be easily deformed under application of pressure, even when the carbon fiber is employed in a high-density electrode, electrically conductive paths and electrolytic solution permeation paths are retained in the electrode. In addition, since the carbon fiber forms a network in the electrode, even when expansion/shrinkage of the electrode occurs during electrode reaction, the strength of the electrode is maintained at a predetermined level. Therefore, in the case where a negative electrode material containing carbon fiber is employed, even when the density of an electrode is increased, the electrode exhibits high capacity and good high-speed charging/discharging performance.

In order to obtain such a function of carbon fiber to be added, preferably, the carbon fiber exhibits excellent electrical conductivity, and has a minimum possible fiber diameter and a maximum possible fiber length so that the number of electrically conductive paths can be increased. From such a viewpoint, the carbon fiber to be added must be fine carbon fiber exhibiting electrical conductivity and toughness.

1-1. Fiber Diameter of Carbon Fiber

When the fiber diameter of the carbon fiber employed in the negative electrode material for a lithium battery of the present invention is excessively large, the size of pores formed in the resultant electrode becomes excessively large, and thus the electrode density fails to be increased, which is not preferred. Since the average particle size of carbonaceous electrode active substance particles which are currently employed in Li ion batteries or Li polymer batteries is several to some tens of µm, the carbon fiber to be employed must have a fiber diameter of about 1 µm at most. Meanwhile, when the fiber diameter of the carbon fiber to be employed is excessively small, fiber filaments of the carbon fiber are buried between active substance particles, and thus a network fails to be formed in the resultant electrode, and pores cannot be formed among the active substance particles. Therefore, the carbon fiber to be employed must have a fiber diameter of at least 1 to several nm. For the reasons described above, the fiber diameter of the carbon fiber which can be employed in the negative electrode material for a lithium battery of the present invention is 1 to 1,000 nm, preferably 10 to 500 nm. The average fiber diameter of the carbon fiber is preferably 5 to 500 nm, more preferably 10 to 200 nm.

1-2. Crystallization Degree of Carbon Fiber

The crystallization degree (i.e., graphitization degree) of the carbon fiber is preferably high. In general, carbon fiber exhibiting high graphitization degree has a developed layer structure, becomes harder, and exhibits enhanced electrical conductivity. Therefore, as described above, such carbon fiber is suitable for use in a carbonaceous negative electrode material for a lithium battery. Graphitization of the carbon fiber can be generally attained through high-temperature treatment of the carbon fiber. The treatment temperature for graphitization, which varies depending on the type of carbon fiber to be employed, is preferably 2,000° C. or higher, more preferably 2,500° C. or higher. When a graphitization promoter which facilitates graphitization, such as boron or Si, is added to the carbon fiber before thermal treatment, the carbon fiber can be effectively graphitized. No particular limitations are imposed on the amount of the promoter to be added, but when the amount of the promoter is excessively small, the effects of the promoter are not obtained, whereas when the amount of the promoter is excessively large, the promoter remains in the carbon fiber as an impurity. Therefore, the amount of the promoter to be added is preferably 0.1 to 100,000 ppm, more preferably 10 to 50,000 ppm.

No particular limitations are imposed on the crystallization degree of the carbon fiber. The average interlayer distance ($d_{002}$) of the carbon fiber as measured by X-ray diffractometry is preferably 0.344 nm or less, more preferably 0.339 nm or less, with the thickness (Lc) of a carbon crystal as measured along the c-axis is 40 nm or less.

1-3. Fiber Length and Aspect Ratio of Carbon Fiber

No particular limitations are imposed on the fiber length of the carbon fiber. As described above, when the fiber length of the carbon fiber becomes larger, the electrical conductivity, strength, and electrolytic solution retainability of the resultant electrode are enhanced, which is preferred. However, when the fiber length of the carbon fiber is excessively large, dispersibility of the carbon fiber in the electrode is impaired, which is not preferred. Therefore, the average fiber length, which varies depending on the type and the fiber diameter of carbon fiber to be employed, is preferably 0.5 to 100 µm, more preferably 1 to 50 µm. When the range of the average fiber length is represented by average aspect ratio (ratio of fiber length to fiber diameter), the average aspect ratio is preferably 5 to 50,000, more preferably 10 to 15,000.

When the carbon fiber contains branched carbon fiber, the electrical conductivity, strength, and electrolytic solution retainability of the resultant electrode are further enhanced, which is preferable. However, when the amount of branched carbon fiber is excessively large, as in the case where the fiber length of the carbon fiber is excessively large, dispersibility of the carbon fiber in the electrode is impaired. Therefore, preferably, the amount of branched carbon fiber is regulated to an appropriate level. The amount of branched carbon fiber can be regulated to some extent by means of a carbon fiber production process or a pulverization process performed subsequent to the production process.

1-4. Production Method for Carbon Fiber

No particular limitations are imposed on the production method for the carbon fiber employed in the present invention. Examples of the carbon fiber production method include a method in which a polymer is formed into fiber through spinning or a similar technique, and the resultant fiber is thermally treated in an inert atmosphere; and a vapor growth method in which an organic compound is subjected to reaction at high temperature in the presence of a catalyst. In the case of carbon fiber produced through the vapor growth method (i.e., vapor grown carbon fiber), the crystal growth direction is parallel to the axis of each fiber filament of the carbon fiber, and the crystallinity of a graphite structure tends to become high along with the fiber length direction tends to become high. Therefore, vapor grown carbon fiber has relatively a small fiber diameter, and exhibits relatively high electrical conductivity and strength.

Vapor grown carbon fiber, which contains crystals grown in the direction along the fiber axis and has branches, is suitably employed for attaining the object of the present invention. Vapor grown carbon fiber can be produced through, for example, the following procedure: a gasified organic compound is fed into a high-temperature atmosphere together with iron serving as a catalyst. The vapor grown carbon fiber to be employed may be "as-produced" carbon fiber; carbon fiber which has undergone thermal treatment at 800 to 1,500° C.; or carbon fiber which has undergone graphitization treatment at 2,000 to 3,000° C. The vapor grown carbon fiber is chosen in accordance with the type of electrical active substance powder to be employed. However, vapor grown carbon fiber which has undergone thermal treatment or graphitization treatment is preferred, since the thus-treated carbon fiber, wherein carbon is highly crystallized, exhibits high carbon crystallinity, high electrical conductivity and high pressure resistance.

In a preferred embodiment of the present invention, the vapor grown carbon fiber has a branched structure. There may be portions (including branches) having a structure with a hollow space being connected to each other throughout fiber. In this case, carbon layers forming a cylinder-shape of fiber assume uninterrupted layers. The term "hollow structure" refers to a structure in which a plurality of carbon layers form a cylinder. The hollow structure encompass an imperfect cylindrical structure, a structure in which the carbon layers are partially broken, and a structure in which the laminated two carbon layers are bonded into a single carbon layer. The cross-section of the cylinder does not necessarily assume a perfect circle, but may assume an oval or a polygonal shape.

Vapor grown carbon fiber generally has, on its surface, irregularities and rough portions, and therefore exhibits enhanced adhesion to an electrode active substance. Particularly when employed with carbonaceous powder particles as an electrode active substance in a negative electrode of a secondary battery, the vapor grown carbon fiber exhibits enhanced adhesion to the carbonaceous particles serving as nuclei. Thus, even in the case where charging/discharging cycles are repeated, the carbon fiber, which also serves as an electrically conductive additive, is firmly deposited on the carbonaceous powder particles and is not dissociated therefrom, whereby electronic conductivity can be maintained and cycle characteristics are improved.

When the vapor grown carbon fiber contains a large amount of branched fiber, networks can be formed in an efficient manner, thereby readily attaining high electronic conductivity and thermal conductivity. In addition, the carbon fiber can be dispersed in the active substance so as to wrap up the active substance, thereby enhancing the strength of the resultant electrode and establishing favorable contact between the particles.

1-5. Amount of Carbon Fiber to be Added

The amount of the carbon fiber to be added is preferably 0.05 to 20 mass %, more preferably 0.1 to 15 mass %, much more preferably 0.5 to 10 mass %, on the basis of the total amount of the carbon fiber, a carbonaceous negative electrode active substance, a binder, and a thickener (which is added if desired). When the amount of the carbon fiber exceeds 20 mass %, the amount of the electrode active substance contained in the resultant electrode is reduced, and thus electrical capacity is decreased, whereas when the amount of the carbon fiber is less than 0.05 mass %, effects of the carbon fiber (e.g., reduction of electrical resistance and enhancement of electrolytic solution permeability) are not obtained in the negative electrode material for a lithium battery of the present invention. The amount of the carbon fiber can be regulated to the above preferred range by adding the carbon fiber to the electrode material so that the carbon fiber amount falls within the above range during the course of preparation of the electrode material.

1-6. Surface Treatment of Carbon Fiber

The carbon fiber to be employed may be subjected to surface treatment in order to control the dispersion state of the carbon fiber in the resultant electrode. No particular limitations are imposed on the surface treatment method. The carbon fiber may be subjected to oxidation treatment, thereby introducing an oxygen-containing functional group to the carbon fiber and imparting hydrophilicity thereto; or the carbon fiber may be subjected to fluorination treatment or silicon treatment, thereby imparting hydrophobicity to the carbon fiber. Alternatively, the carbon fiber may be coated with, for example, phenolic resin, or may be subjected to mechanochemical treatment or a similar treatment. When the carbon fiber is subjected to excessive surface treatment, the electrical conductivity and strength of the carbon fiber are considerably impaired, and therefore the surface treatment of the carbon fiber must be controlled to a moderate level. Oxidation treatment of the carbon fiber can be carried out through, for example, the following procedure: the carbon fiber is heated in air at 500° C. for about one hour. The hydrophilicity of the carbon fiber is enhanced by the treatment.

In the present invention, carbon fiber which has undergone oxidation treatment, i.e., carbon fiber having a hydrophilic surface, is preferably employed, since styrene-butadiene rubber serving as a binder is often employed in the form of aqueous dispersion.

2. Styrene-Butadiene Rubber (SBR) (Binder)

In the carbonaceous negative electrode material for a lithium battery of the present invention, SBR is employed as an electrode binder. The amount of SBR to be used can be reduced as compared with the case of a fluorine-containing resin binder (e.g., PVDF), which has generally been employed. Unlike the case of PVDF, which is used with an organic solvent, when SBR is mixed with an electrode active substance in the form of aqueous dispersion, explosion-proof facilities is not required. Therefore, employment of SBR is advantageous in enabling to simplify an electrode production process. Since SBR generally has a low glass transition temperature (Tg), an electrode employing SBR as a binder exhibits excellent low-temperature characteristics and high-speed charging/discharging characteristics.

SBR is classified into two types: emulsion-polymerized SBR and solution-polymerized SBR. Examples of the emulsion-polymerized SBR is obtained as latex and may be dried and used as dry rubber. Examples of the solution-polymerized SBR include random SBR, block SBR, and symmetric block SBR, which have different types of copolymerization of styrene and butadiene. SBR also includes high styrene rubber, which has high compositional proportion of styrene and a high glass transition temperature (Tg). Further, SBR includes a modified SBR, which is copolymerized with an unsaturated carboxylic acid or an unsaturated nitrile compound. These types of SBR differ slightly from one another in physical properties (e.g., adhesion property, strength and thermal property), which difference is attributed to the copolymerization type and the styrene/butadiene copolymerization ratio. The type of SBR employed as a binder in the carbonaceous negative electrode material for a lithium battery of the present invention can be appropriately selected in accordance with the type of a negative electrode active substance to be employed.

Among the aforementioned types of SBR, a latex-type aqueous dispersion prepared by dispersing emulsion- or solution-polymerized SBR in water is suitable for use in the carbonaceous negative electrode material for a lithium battery of the present invention, since the aqueous dispersion is readily mixed with a carbonaceous negative electrode active substance. In order to make SBR well coordinated with an electrolytic solution in the electrode produced thereof, or to improve low-temperature characteristics of the electrode, SBR preferably has a styrene content of 50 mass % or less in copolymerization and a glass transition temperature of 0° C. or lower.

The size of SBR particles contained in the aqueous dispersion should not be excessively large or excessively small, in order to be uniformly dispersed in a carbonaceous negative electrode active substance and to attain effective adhesion between the active substance particles. Therefore, the average particle size of SBR employed in the carbonaceous negative electrode material for a lithium battery of the present invention is preferably 10 to 500 nm.

The amount of SBR to be added to the negative electrode material cannot be uniformly determined, depending on the amounts of carbon fiber and a carbonaceous negative electrode active substance which are to be mixed with SBR. However, when the SBR amount is excessively large, the content of the carbonaceous negative electrode active substance in the negative electrode material is reduced, and thus the capacity of the resultant negative electrode is reduced, and the resistance of the electrode is increased. In addition, the number of reaction sites of the negative electrode may be reduced, leading to further reduction of the electrode capacity. In contrast, when the SBR amount is excessively small, the effect of SBR as a binder is reduced, and therefore breakage of the negative electrode occurs during the course of assembly of a battery or charging/discharging of the battery, leading to reduction of charging/discharging cycle life, which is not preferred. Therefore, the amount of SBR to be added is preferably 0.1 to 6.0 mass %, more preferably 0.3 to 5.0 mass %, on the basis of the total amount of the carbonaceous negative electrode active substance, the binder, the carbon fiber, and a thickener (which is added if desired).

3. Carbonaceous Negative Electrode Active Substance

An carbonaceous negative electrode active substance is a substance which contains carbon and is capable of electrochemically absorbing (occluding) and releasing ions.

In the present invention, SBR (preferably an aqueous SBR dispersion) is employed as an electrode binder. Therefore, a carbonaceous negative electrode active substance having a maximum possible specific surface area is preferably employed, from the viewpoints of wettability improvement, handling, electrode strength, and electrolytic solution retainability. Specifically, there is employed a carbonaceous negative electrode active substance having a specific surface area as measured by means of the BET method (i.e., a BET specific surface area) of 1 $m^2/g$ or more. However, when a carbonaceous negative electrode active substance having an excessively large specific surface area is employed, side reaction tends to occur between the active substance and an electrolytic solution. The BET specific surface area is preferably 1.0 to 7.0 $m^2/g$, more preferably 1.5 to 6.0 $m^2/g$.

The carbonaceous negative electrode active substance may be an active substance mainly comprising a non-graphite carbon material, or an active substance mainly comprising a graphite carbon material.

A non-graphite carbon material is a carbon material which does not contain a three-dimensional regularity of graphite crystals, and includes a turbostratic structure carbon material and an amorphous carbon material, e.g., vitreous carbon and a carbon material which does not exhibit high crystallinity due to a thermal treatment at a low temperature.

A graphite carbon material is a carbon material which contains a three-dimensional regularity of graphite crystals, and includes a natural graphite and artificial graphite obtained by thermally treating a readily-graphitizable carbon material, as well as kish graphite obtained by redeposition of graphite from melted iron.

As used herein, the term "mainly comprising" refers to the component whose content of the active substance is 50 mass % or higher, preferably 60 mass % or higher, more preferably 80 mass % or higher, particularly preferably 90 mass % or higher.

Examples of the active substance mainly comprising a non-graphite carbon material include a carbon material obtained through thermal treatment of a difficult-to-graphitize polymer such as phenolic resin; a carbon material obtained through thermal treatment of pitch or coke at about 1,000° C.; a carbon material obtained through thermal treatment of a conjugated polymer such as an electrically conductive polymer; and a CVD carbon material deposited onto a substrate by means of thermal CVD. When Si is added to such a carbon material during the course of thermal treatment of the material, the electrical capacity of the resultant negative electrode can be increased.

Such a non-graphite carbon material preferably assumes a spherical shape of maximum possible roundness, from the viewpoints of handling of the material when an electrode sheet is prepared, and prevention of side reaction between the material and an electrolytic solution when the material is employed in a battery.

The average roundness of such a non-graphite carbon material is preferably 0.70 to 0.99 as measured by use of a flow particle image analyzer.

No particular limitations are imposed on the average particle size of such a non-graphite carbon material, since the average particle size varies depending on the target shape of an electrode sheet. However, generally, there is employed a non-graphite carbon material having an average particle size of 1 to 50 μm as measured by means of laser diffractometry.

No particular limitations are imposed on the bulk density of the negative electrode material employing such a non-graphite carbon material, since the bulk density varies depending on the true density of the carbonaceous active substance. However, the true density of such a non-graphite carbon material is generally 1.9 $g/cm^3$ or higher, and the bulk density of the layer of the synthesized agent comprising a negative electrode active substance, binder and electrically conductive additive is preferably 1.5 $g/cm^3$ or higher, more preferably 1.7 $g/cm^3$ or higher.

In the present invention, the active substance mainly comprising a graphite carbon material may be a graphite carbon material, which is generally employed as a carbon active substance in an Li ion battery. Such a graphite active substance exhibits high crystallinity, enables uniform intercalation and release of lithium ions, and is rapidly dispersed. Therefore, when the graphite active substance is employed in a battery, the resultant battery undergoes little change in discharge potential, and exhibits excellent large current load characteristics. Such a graphite active substance has a true density as high as about 2.2 $g/cm^3$ and also, the electrode formed thereof has a bulk density of 1.5 $g/cm^3$. In the present invention, the porosity of such an electrode can be reduced, so as to increase the bulk density of the electrode to 1.7 $g/cm^3$ or higher.

The graphite active substance to be employed preferably has a maximum possible roundness. Specifically, there is employed a graphite active substance having an average roundness of 0.70 to 0.99 as measured by use of a flow particle image analyzer, and an average particle size of about 1 to about 50 μm as measured by means of laser diffractometry.

The graphite active substance to be employed preferably has maximum possible crystallinity. Preferably, $C_0$ of a (002) plane as measured by means of X-ray diffractometry is 0.6900 nm ($d_{002}$=0.3450 nm) or less, La (the size of a crystallite as measured along the a-axis) is greater than 100 nm, and Lc (the size of a crystallite as measured along the c-axis) is greater than 100 nm. Laser Raman R value (the ratio of the intensity of a peak at 1,360 $cm^{-1}$ in a laser Raman spectrum to that of a peak at 1,580 $cm^{-1}$ in the spectrum) is preferably 0.01 to 0.9. The true density of the graphite active substance is preferably 2.20 $g/cm^3$ or higher.

When boron is added to the graphite active substance and the resultant mixture is thermally treated, crystallinity of the active substance is enhanced, and the active substance is improved in its wettability with an electrolytic solution and stability, which is preferable. No particular limitations are imposed on the amount of boron to be added, but when the boron amount is excessively small, the effects of boron fail to be attained, whereas when the boron amount is excessively large, boron remains in the active substance as an impurity. The amount of boron to be added is preferably 0.1 mass ppm to 100,000 mass ppm, more preferably 10 mass ppm to 50,000 mass ppm.

4. Negative Electrode for Lithium Battery 4-1. Negative Electrode Material Composition Containing Carbonaceous Negative Electrode Active Substance, Electrode Binder and Carbon Fiber In general, a carbonaceous negative electrode material for a lithium battery is produced through the following procedure: a carbonaceous negative electrode active substance, an electrode binder and, if desired, an electrically conductive additive (e.g., carbon black or graphite fine powder) are wet- or dry-mixed in predetermined proportions; and the resultant mixture is applied onto a metallic collector (e.g., Cu collector), followed by drying and pressing. Meanwhile, in the case of the carbonaceous negative electrode material for a lithium battery of the present invention to which carbon fiber having a high aspect ratio is added, the carbon fiber fails to be uniformly dispersed by means of a method which has been generally employed. In addition, since the negative electrode material of the present invention employs an aqueous SBR dispersion as an electrode binder, hydrophobic carbon fiber (particularly graphitized carbon fiber) fails to be sufficiently dispersed in the negative electrode material.

The carbonaceous negative electrode material for a lithium battery of the present invention is produced by applying, onto a collector, a negative electrode material composition containing a carbonaceous negative electrode active substance, carbon fiber and an SBR binder, followed by molding. In the present invention, the negative electrode material composition is prepared by a method which has not yet been known; specifically, a method in which carbon fiber having a fiber diameter of 1 to 1,000 nm, a carbonaceous negative electrode active substance having a BET specific surface area of 1 $m^2/g$ or more, and, if desired, a carbonaceous powder as an electrically conductive additive are fully dispersed in an aqueous thickener solution (e.g., an aqueous solution of a carboxymethyl cellulose compound); and an aqueous dispersion of styrene-butadiene rubber is added to the resultant dispersion, followed by stirring for a relatively short period of time.

This preparation method is intended to simplify a step of stirring a mixture obtained through addition of an aqueous SBR dispersion to a dispersion which has been prepared by fully dispersing carbon fiber filaments in an aqueous solution. When the stirring step after addition of the SBR binder is performed for a long period of time; the carbon fiber filaments which have been dispersed may reaggregate, resulting in an increase in specific resistance of the electrode and lowering of electrolytic solution permeability; i.e., deterioration of battery performance. The reason for reaggregation of the carbon fiber filaments is considered as follows. The binder, which is added after dispersion of the carbon fiber filaments, exhibits high affinity with the aqueous thickener solution, and therefore, the hydrophobic carbon fiber filaments, which have been dispersed in the thickener solution, are gradually separated from the thickener solution. Specific examples of the preparation method include the below-described methods (A) through (D).

(A) A method in which carbon fiber is added to an aqueous thickener solution and is fully dispersed therein under stirring; a carbonaceous negative electrode active substance and, if desired, another carbonaceous powder as an electrically conductive additive are added to the resultant dispersion, followed by stirring; and an aqueous SBR dispersion is added to the resultant mixture, followed by stirring for a relatively short period of time.

(B) A method in which carbon fiber is added to an aqueous thickener solution, and the carbon fiber is fully dispersed therein under stirring; a carbonaceous negative electrode active substance and, if desired, another carbonaceous powder as an electrically conductive additive are added to the resultant dispersion, followed by stirring; an aqueous thickener solution is added to the resultant mixture, to thereby regulate the viscosity of the mixture; and an aqueous SBR dispersion is added to the resultant mixture, followed by stirring for a relatively short period of time.

(C) A method in which a carbonaceous negative electrode active substance and, if desired, another carbon-powder electrically conductive additive are added to an aqueous thickener solution, followed by stirring; carbon fiber is added to the resultant mixture and is fully dispersed therein under stirring; and an aqueous SBR dispersion is added to the resultant dispersion, followed by stirring for a relatively short period of time.

(D) A method in which a carbonaceous negative electrode active substance powder, carbon fiber, and, if desired, another carbonaceous powder as an electrically conductive additive are dry-mixed together, to thereby fully disperse the carbon fiber in the resultant mixture; an aqueous thickener solution is added thereto, followed by stirring; and an aqueous SBR dispersion is added to the resultant mixture, followed by stirring for a relatively short period of time.

A rough standard of the time (relatively short period of time) for stirring after addition of an aqueous SBR dispersion cannot be uniformly determined depending on, for example, the type and amount of carbon fiber or the stirring method. The stirring time is appropriately determined in accordance with the state of the composition which has been allowed to stand after stirring. The stirring time is generally 120 minutes or less, preferably 10 to 90 minutes.

Among the aforementioned preparation methods, methods (A) and (B), which enable relatively easy dispersion of carbon fiber, are particularly preferred. In these methods, preferably, carbon fiber is added to an aqueous thickener solution such that the carbon fiber content of the resultant dispersion becomes 0.1 to 10 mass % on the basis of the total amount of a carbonaceous negative electrode active substance, binder and electrically conductive additive.

In the aforementioned preparation methods, a thickener is a nonionic polymer employed for regulating the viscosity of the negative electrode material composition to a level such that the composition can be applied onto a collector.

Examples of the thickener to be employed include aqueous solutions of nonionic polymers such as polyethylene glycol, cellulose, polyacrylamide, poly(N-vinylamide), and poly(N-vinylpyrrolidone). Among these nonionic polymers, polyethylene glycol and celluloses such as carboxymethyl cellulose (CMC) are preferred, with carboxymethyl cellulose (CMC) being particularly preferred. The amount of the thickener to be added cannot be uniformly determined depending on the type of the thickener. However, the amount of the thickener is preferably 0.1 to 4 mass %, more preferably 0.3 to 3 mass %, on the basis of the total amount of the carbonaceous negative electrode active substance, binder, carbon fiber, and thickener. The thickener is preferably used in a form of an aqueous solution, wherein the viscosity of the solution as measured at room temperature is 50 to 5,000 mPa·s (preferably 100 to 3,000 mPa·s) and the thickener content is preferably 0.3 to 5 mass %.

Next will be described a carboxymethyl cellulose (CMC) compound, which is a preferred thickener.

No particular limitations are imposed on the physical properties (e.g., molecular weight) of the CMC compound to be employed. The amount of the CMC compound to be added, which varies depending on the type of the carbon fiber or negative electrode active substance to be employed, is preferably regulated to a minimum possible level, since the CMC compound does not participate in battery reaction, and when an excessively large amount of the CMC compound is added, the content of the negative electrode active substance in the resultant electrode is reduced. The content of the CMC compound in an aqueous CMC compound solution is preferably regulated to a minimum possible level, so lone as the CMC compound can exhibit its thickening effects. The amount of the CMC compound to be added is preferably 0.1 to 4.0 mass %, more preferably 0.3 to 3 mass %, on the basis of the total amount of the carbonaceous negative electrode active substance, binder, carbon fiber and CMC compound. The CMC compound is used in the form of a 0.3 to 5 mass % (preferably about 1 mass %) aqueous solution. The viscosity of such an aqueous CMC compound solution as measured at room temperature is 50 to 5,000 mPa·s, preferably 100 to 3,000 mPa·s.

When the content of SBR in the aqueous SBR dispersion is excessively high, it becomes difficult to mix the dispersion with the other components of the negative electrode material composition within a short period of time, whereas when the SBR content is excessively low, the viscosity of the composition, which has been increased by use of the aqueous CMC solution, is again reduced. Therefore, the content of SBR in the aqueous SBR dispersion is preferably 10 to 60 mass %.

The dispersion state of the components of the electrode material in the electrode varies depending on, for example, the types, compositional proportions and combinations of the components. Since the dispersion state affects the resistance, liquid absorbability or other characteristics of the electrode, optimal compositional proportions and concentration conditions of the components must be selected.

Various stirring apparatuses may be used. Examples of the stirring apparatus which may be employed include a ribbon mixer, a screw kneader, a Spartan ryuzer, a Lodige mixer, a planetary mixer, a defoaming kneader, a stirring-blade-equipped general-purpose mixer and a paint shaker. Among these apparatuses, a planetary mixer, a defoaming kneader and a stirring-blade-equipped general-purpose mixer enable relatively easy stirring in the above-described four preparation methods, and a defoaming kneader and a stirring-blade-equipped general-purpose mixer are preferred, with a stirring-blade-equipped general-purpose mixer being particularly preferred.

4-2. Preparation of Negative Electrode Material Sheet

A negative electrode material sheet for a lithium battery of the present invention can be prepared by applying the above-obtained negative electrode material composition to a collector foil.

Application of the composition to a collector foil may be carried out by means of any known technique. For example, the composition is applied to a collector foil by use of a doctor blade, a bar coater or a similar apparatus, and then the resultant product is subjected to molding through, for example, roll pressing.

Examples of the collector which may be employed include known materials, such as a copper foil (which is employed in currently available Li ion batteries), an aluminum foil, a stainless steel foil, a nickel foil, a titanium foil, a foil of an alloy of such metals, and a carbon sheet. Among these, a copper foil and a copper alloy foil are preferred from the viewpoints of such as strength, electrochemical stability and production cost.

No particular limitations are imposed on the thickness of the collector foil employed in the present invention. However, when the thickness is excessively small, the strength of the collector foil is reduced, raising problems in terms of strength of the negative electrode material sheet or handling of the collector foil during application of the composition thereto. In contrast, when the thickness is excessively large, the ratio by mass (or volume) of the collector foil to the components of the battery becomes high, and thus the energy density of the battery is reduced. In addition, the electrode material sheet is hardened during production of the battery, leading to problems in winding. Therefore, the thickness of the collector foil is preferably 0.5 to 100 µm, particularly preferably 1 to 50 µm.

The composition-applied electrode material sheet is dried by means of any known technique, and subsequently subjected to molding by means of a known technique such as roll pressing or pressure pressing, so as to be shaped with a desired thickness and density.

No particular limitations are imposed on the pressing pressure, since the pressure varies depending on the type of the negative electrode active substance to be employed, or depending on the target electrode density. However, the pressure is generally regulated to 1 ton/cm$^2$ or higher. No particular limitations are imposed on the thickness of the electrode material sheet, since the thickness varies in accordance with the target shape of the resultant battery. However, the thickness is generally regulated to 0.5 to 2,000 µm, preferably 5 to 1,000 µm.

4-3. Characteristics of Negative Electrode Material

The carbonaceous negative electrode material for a lithium battery of the present invention, which is produced through the above-described method, contains uniformly dispersed carbon fiber. Therefore, an electrode formed of the electrode material exhibits low specific resistance. The lower specific resistance of electrode is, current density during charging/discharging of the battery can be increased, and high-speed charging/discharging can be attained. Low specific resistance of electrode indicates that a carbon fiber network is distributed throughout the electrode; i.e., the electrode has enhanced strength. Therefore, the battery exhibits long charging/discharging cycle life.

An electrode formed of the negative electrode material of the present invention exhibits, at 25° C., a specific resistance of 0.5 Ωcm or less, or even 0.3 Ωcm or less.

In any of the above-described preparation methods (A) through (D), when stirring after addition of SBR is performed for a long period of time, carbon fiber filaments which have been dispersed tend to reaggregate as described above, and thus the resultant negative electrode material exhibits high specific resistance. Specifically, when stirring after addition of SBR is performed for a long period of time in any of the above-described preparation methods (A) through (D) for the preparation of a composition, a negative electrode material formed of the resultant composition exhibits a specific resistance lower by at most about 10% than that of a negative electrode material formed of a composition which does not contain carbon fiber, the composition being prepared through any of the above-described preparation methods (A) through (D). In contrast, the negative electrode material of the present invention, which is formed of a composition prepared through any of the above-described preparation methods (A) through (D), exhibits a specific resistance lower by at least 20% (generally 40% or more) than that of a negative electrode material formed of a composition which does not contain carbon fiber, the composition being prepared through any of the above-described preparation methods (A) through (D). That is, the specific resistance of the negative electrode material of the present invention can be reduced to 80% or less (even to 60% or less) of the specific resistance of a negative electrode material formed of a composition which does not contain carbon fiber having a fiber diameter of 1 to 1,000 nm, the composition being prepared through any of the above-described preparation methods (A) through (D).

Similar to the case of the specific resistance of the negative electrode material, the time for stirring after addition of SBR affects the electrolytic solution permeability of the negative electrode material. Specifically, when stirring after addition of SBR is performed for a long period of time in any of the above-described preparation methods (A) through (D), the resultant negative electrode material fails to exhibit sufficiently improved electrolytic solution permeability. This phenomenon becomes pronounced in the case of an electrode formed to have high density. Specifically, in the case of, for example, a graphite negative electrode formed to have a density of 1.7 g/cm$^3$ or higher, when stirring after addition of SBR is performed for a long period of time in any of the above-described preparation methods (A) through (D) for the preparation of a composition, a negative electrode material formed of the resultant composition exhibits an electrolytic solution permeation rate higher by at most about 30% than that of a negative electrode material formed of a composition which does not contain carbon fiber, the composition being prepared through any of the above-described preparation methods (A) through (D). In contrast, the negative electrode material of the present invention, which is formed of a composition prepared through any of the above-described preparation methods (A) through (D), exhibits an electrolytic solution permeation rate higher by at least 35% (generally 60% or more) than that of a negative electrode material formed of a composition which does not contain carbon fiber, the composition being prepared through any of the above-described preparation methods (A) through (D).

5. Lithium Battery

A lithium battery of high performance can be produced by employing the negative electrode material for a lithium battery of the present invention in combination with a various positive electrode materials such as lithium cobaltate. Particularly, the negative electrode material for a lithium battery of the present invention is suitable for the needs in a non-aqueous secondary battery of high energy density which is currently prevalent in the market, such as an Li ion battery or an Li polymer battery.

Next will be described a production method for an Li ion battery or Li polymer battery employing the negative electrode material of the present invention, but the battery production method is not limited to the below-described method.

5-1. Positive Electrode Active Substance

There has been employed, as a positive electrode active substance for an Li ion battery, a cobalt oxide such as lithium cobaltate, a manganese oxide such as lithium manganate, a nickel oxide such as lithium nickelate, a composite oxide formed of such oxides, or a mixture of such oxides.

In the lithium battery of the present invention employing the carbonaceous negative electrode material for a lithium battery, a variety of positive electrode active substances other than the aforementioned metal oxides may be employed. In the lithium battery of the present invention, a lithium-containing transition metal oxide can be employed as a positive electrode active substance. The lithium-containing transition metal oxide is preferably an oxide predominantly containing lithium and at least one transition metal selected from Ti, V, Cr, Mn, Fe, Co, Ni, Mo and W, in which the ratio by mol between lithium and the transition metal is 0.3 to 2.2. More preferably, the positive electrode active substance is an oxide predominantly containing lithium and at least one transition metal selected from V, Cr, Mn, Fe, Co and Ni, in which the ratio by mol between lithium and the transition metal is 0.3 to 2.2. The positive electrode active substance may contain Al, Ga, In, Ge, Sn, Pb, Sb, Bi, Si, P, B, etc. in an amount of less than 30 mol % on the basis of the entirety of the transition metal existing as a primary component. Among the aforementioned positive electrode active substances, a preferred substance is at least one species selected from the materials being represented by the formula $Li_xMO_2$ (wherein M represents at least one element selected from Co, Ni, Fe and Mn, and x is 0 to 1.2); or at least one species selected from the materials having a spinel structure and being represented by the formula $Li_yN_2O_4$ (wherein N includes at least Mn, and y is 0 to 2).

Particularly preferably, the positive electrode active substance is at least one species selected from the materials containing $Li_yM_aD_{1-a}O_2$, wherein M represents at least one element selected from Co, Ni, Fe and Mn; D represents at least one element selected from among Co, Ni, Fe, Mn, Al, Zn, Cu, Mo, Ag, W, Ga, In, Sn, Pb, Sb, Sr, B and P, with the proviso that the element corresponding to M being excluded; y is 0 to 1.2; and a is 0.5 to 1; or at least one species selected from the materials having a spinel structure and being represented by the formula $Li_z(N_bE_{1-b})_2O_4$, wherein N represents Mn; E represents at least one element selected from Co, Ni, Fe, Mn, Al, Zn, Cu, Mo, Ag, W, Ga, In, Sn, Pb, Sb, Sr, B and P; b is 1 to 0.2; and z is 0 to 2.

Specific examples of the positive electrode active substance include $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$ and $Li_xMn_cFe_{2-c}O_4$, wherein x is 0.02 to 1.2, a is 0.1 to 0.9, b is 0.8 to 0.98, c is 1.6 to 1.96, and z is 2.01 to 2.3. Examples of the most preferred lithium-containing transition metal oxides include $L_xCoO_2$, $Li_xNiO_2$, $L_xMnO_2$, $Li_xCo_aNi_{1-a}O_2$, $Li_xMn_2O_4$ and $Li_xCo_bV_{1-b}O_z$, wherein x is 0.02 to 1.2, a is 0.1 to 0.9, b is 0.9 to 0.98, and z is 2.01 to 2.3. The value x is a value as measured before the start of charging/discharging, and is increased or decreased through charging/discharging.

The positive electrode active substance may be a positive electrode material for a next-generation Li battery, such as a metal sulfide (e.g., titanium sulfide or molybdenum sulfide) or an iron olivine compound such as $LiFePO_4$. An iron olivine compound such as $LiFePO_4$, which contains iron, is particularly preferred, from the viewpoints of high theoretical capacity, resource abundance, environmental safety, heat resistance, etc.

The average particle size of particles of the positive electrode active substance is not particularly limited but is preferably 0.1 to 50 μm. Preferably, the volume of particles having a particle size of 0.5 to 30 μm is 95% or more on the basis of the entire volume of the positive electrode active substance particles. More preferably, the volume of particles having a particle size of 3 μm or less is 18% or less, and the volume of particles having a particle size of 15 μm to 25 μm inclusive is 18% or less on the basis of the entire volume of the positive electrode active substance particles. The specific surface area of the positive electrode active substance is not specifically limited but is preferably 0.01 to 50 m$^2$/g, particularly preferably 0.2 to 10 m$^2$/g as measured by means of the BET method.

5-2. Preparation of Positive Electrode Material Sheet

No particular limitations are imposed on the preparation method for the positive electrode material sheet of the lithium battery of the present invention. In general, the positive electrode material sheet can be prepared through the following procedure: a positive electrode active substance (e.g., lithium cobaltate), an electrode binder, and, if desired, an electrically conductive additive (e.g., carbon black or graphite fine powder) or carbon fiber to be employed in the carbonaceous negative electrode material for a lithium battery of the present invention are wet- or dry-mixed together in predetermined proportions; and the resultant Mixture is applied onto a collector formed of Al and the like, followed by drying and pressing.

For example, firstly, a composition for a positive electrode material (hereinafter may be referred to as a "positive electrode material composition") is prepared through the following procedure: lithium cobaltate powder and acetylene black (abbreviated as "AB") are dry-mixed together in predetermined proportions by use of a high-speed, small-sized mixer equipped with blades (IK mixer); and subsequently, an N-methylpyrrolidone (NMP) solution containing polyvinylidene fluoride (PVDF) serving as an electrode binder is added to the above-formed mixture so as to attain predetermined proportions by mass, followed by kneading of the resultant mixture by use of a planetary mixer.

NMP is further added to the thus-prepared positive electrode material composition, for regulation of the viscosity of the composition. Subsequently, the resultant composition is applied onto a rolled Al foil (25 μm) by use of a doctor blade, so as to attain a predetermined thickness, followed by drying by heating under reduced pressure. Thereafter, the composition-applied foil is molded by pressing, so as to attain target thickness and density. The pressure for molding is not particularly limited but is generally about $1 \times 10^3$ to about $3 \times 10^3$ kg/cm². The thus-molded product is further dried by heating under reduced pressure, to thereby prepare the positive electrode material sheet.

The electrode binder to be employed in the positive electrode material may be, in addition to the aforementioned PVDF, a fluorine-containing polymer such as polytetrafluoroethylene or a rubber such as SBR which is employed in the aforementioned negative electrode material or an acrylate polymer. Any known solvent suitable for each electrode binder may be employed. For example, N-methylpyrrolidone, toluene, acetone, etc. is employed as a solvent for a fluorine-containing polymer, whereas water and the like is employed as a solvent for SBR as a binder.

The amount of the electrode binder employed in the positive electrode material is preferably 0.5 to 20 parts by mass, particularly preferably about 1 to about 15 parts by mass, on the basis of 100 parts by mass of the positive electrode active substance.

No particular limitations are imposed on the method for kneading, which is performed after addition of the solvent, and kneading can be carried out by use of any known apparatus such as a ribbon mixer, a screw kneader, a Spartan ryuzer, a Lodige mixer, a planetary mixer, or a stirring-blade-equipped general-purpose mixer.

The above-described negative electrode material sheet and positive electrode material sheet for the lithium battery of the present invention are formed into a predetermined shape, and the resultant sheets are prepared into a laminate of positive electrode material sheet/separator/negative electrode material sheet. The thus-prepared laminate is stored in a container having a shape of a coin, rectangle, cylinder, sheet, etc., such that the positive electrode and the negative electrode do not come into contact with each other. When there is a possibility that the laminate has adsorbed moisture or oxygen during the course of lamination or storage, the laminate is again dried under reduced pressure and/or in an inert atmosphere of low dew point (−50° C. or lower), with the laminate being stored in the container, and then the laminate is transferred into an inert atmosphere of low dew point. Subsequently, an electrolytic solution is added to the container, and the container is sealed, to thereby produce an Li ion battery and/or an Li polymer battery.

Any known separator may be employed, but a polyethylene- or polypropylene-made microporous film is particularly preferred due to its slimness and strength. The porosity of the separator is preferably high, from the viewpoint of ion conduction. However, excessively high porosity could cause deterioration of the strength of the separator, as well as short circuit between the positive and negative electrodes. Therefore, the porosity of the separator is generally regulated to 30 to 90%, preferably 50 to 80%. Meanwhile, the thickness of the separator is preferably small, from the viewpoints of ion conduction and battery capacity. However, excessively small thickness could cause deterioration of the strength of the separator, as well as short circuit between the positive and negative electrodes. Therefore, the thickness of the separator is generally regulated to 5 to 100 μm, preferably 5 to 50 μm. Such microporous films may be employed in combination of two or more species, or may be employed in combination with another type of a separator such as non-woven fabric.

In the non-aqueous secondary battery of the present invention, particularly a lithium ion battery and/or an Li polymer battery, any known non-aqueous electrolyte may be used.

The non-aqueous electrolyte of the present invention may be any known one such as a non-aqueous electrolytic solution prepared by dissolving an electrolyte salt in an non-aqueous solvent, and a non-aqueous polymer electrolyte prepared by swelling a polymer solid electrolyte with a non-aqueous solvent.

Examples of preferred organic solvents serving as the aforementioned non-aqueous solvent include ethers such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether and ethylene glycol phenyl ether; amides such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide and hexamethylphosphoryl amide; sulfur-containing compounds such as dimethyl sulfoxide and sulfolane; dialkyl ketones such as methyl ethyl ketone and methyl isobutyl ketone; cyclic ethers such as ethylene oxide, propylene oxide, tetrahydrofuran, 2-methoxytetrahydrofuran, 1,2-dimethoxyethane and 1,3-dioxolan; carbonates such as ethylene carbonate and propylene carbonate; γ-butyrolactone; N-methylpyrrolidone; acetonitrile; and nitromethane. More preferred examples include esters such as ethylene carbonate, butylene carbonate, diethyl carbonate, dimethyl carbonate, propylene carbonate, vinylene carbonate and γ-butyrolactone; ethers such as dioxolan, diethyl ether and diethoxyethane; dimethyl sulfoxide; acetonitrile; and tetrahydrofuran. Particularly, carbonate-based non-aqueous solvents such as ethylene carbonate and propylene carbonate are preferably employed. These solvents may be employed singly or in combination of two or more species.

A lithium salt is employed as an electrolytic salt. Examples of lithium salts generally known to serve as an electrolytic salt include $LiClO_4$, $LiBF_4$, $LiPF_6$, $LiAlCl_4$, $LiSbF_6$, LiSCN, LiCl, $LiCF_3SO_3$, $LiCF_3CO_2$ and $LiN(CF_3SO_2)_2$.

Examples of the polymer solid electrolyte include electrolytes obtained by adding the aforementioned electrolyte salts to, for example, polyethylene oxide derivatives and polymers containing the derivatives, polypropylene oxide derivatives and polymers containing the derivatives, phosphoric acid ester polymers, and polycarbonate derivatives and polymers containing the derivatives.

No particular limitations are imposed on the selection of elements required for producing the battery, other than the aforementioned elements.

BEST MODE TO CARRY OUT THE INVENTION

The present invention will next be described in more detail with reference to representative examples, which are provided for illustration purposes only and should not be construed as limiting the invention thereto.

[1] Mean Roundness:

Mean roundness of the carbon material was measured by use of a flow particle image analyzer FPIA-2100 (product of Sysmex Corporation), as described below.

A measurement sample was subjected to cleaning (removal of micro dust) by use of a 106 μm filter. The sample (0.1 g) was added to ion-exchange water (20 mL), and an anionic/nonionic surfactant (0.1 to 0.5 mass %) was added to the resultant mixture so as to uniformly disperse the sample in the mixture, thereby preparing a measurement dispersion containing the sample. Dispersion of the sample was carried out for five minutes by use of ultrasonic cleaner UT-105S (product of Sharp Manufacturing Systems Corporation).

The summary of measurement principle and other details are provided in, for example, "*Funtai to Kogyo*," VOL: 32, No. 2, 2000, or Japanese Patent Laid-Open Publication (kokai) No. 8-136439 (U.S. Pat. No. 5,721,433). Specifically, the measurement will further be described as follows.

When the measurement sample dispersion passes through the flow path of a flat, transparent flow cell (thickness: about 200 μm), the dispersion is irradiated with strobe light at intervals of 1/30 second, and photographed by a CCD camera. Still images were captured at predetermined times and image analysis was performed. Roundness was calculated by use of the following formula.

Roundness=(the circumference of a circle as calculated from a circle-equivalent diameter)/(the peripheral length of a projected image of a particle)

The term "circle-equivalent diameter" refers to the diameter of a true circle having an area equal to the actual projection area of a particle that has been obtained from a photograph of the particle. The roundness of the particle is obtained by dividing the circumference of a circle as calculated from the circle-equivalent diameter by the actual peripheral length of the projected particle. For example, a particle having a true round shape has a roundness of 1, whereas a particle having a more complicated shape has a roundness of a smaller value. The mean roundness of particles is an average of the roundness values of the particles respectively measured by the above-described method.

[2] Average Particle Size:

The average particle size was measured by use of a particle size distribution analyzer by laser diffraction scattering (Microtrac HRA, product of Nikkiso Co., Ltd.).

[3] Specific Surface Area:

The specific surface area was measured by use of a specific surface area measuring apparatus (NOVA-1200, product of Yuasa Ionics Inc.) by means of the BET method, which is generally employed for specific surface area measurement.

[4] Preparation of Carbonaceous Negative Electrode Material Composition

Method A:

In a stirring-blade-equipped general-purpose mixer (T.K. HIVIS MIX, product of Tokushu Kikakogyo Co., Ltd.), a predetermined amount of carbon fiber was added to 1 mass % aqueous CMC solution (Daicel 2200, product of Daicel Chemical Industries, Ltd.) at room temperature, followed by stirring at a rotation speed of 25 rpm for 30 minutes, to thereby disperse the carbon fiber in the solution. Subsequently, a predetermined amount of carbonaceous negative electrode active substance powder was added to the resultant dispersion, followed by stirring for 30 minutes. Thereafter, 40 mass % aqueous SBR dispersion (BM400B, product of Zeon Corporation) was added to the resultant mixture, followed by stirring for 15 minutes, to thereby prepare a carbonaceous negative electrode material composition.

Method A-2:

The procedure of method A was repeated, except that stirring was performed for 100 minutes after addition of 40 mass % aqueous SBR dispersion (BM400B, product of Zeon Corporation), to thereby prepare a carbonaceous negative electrode material composition.

Method A-3:

The procedure of method A was repeated, except that stirring was performed for 150 minutes after addition of 40 mass % aqueous SBR dispersion (BM400B, product of Zeon. Corporation), to thereby prepare a carbonaceous negative electrode material composition.

Method B:

In a stirring-blade-equipped general-purpose mixer (T.K. HIVIS MIX, product of Tokushu Kikakogyo Co., Ltd.), a predetermined amount of carbon fiber was added to 1 mass % aqueous CMC solution (Daicel 2200, product of Daicel Chemical Industries, Ltd.) at room temperature, followed by stirring at a rotation speed of 25 rpm for 30 minutes, to thereby disperse the carbon fiber in the solution. Subsequently, a predetermined amount of carbonaceous negative electrode active substance powder was added to the resultant dispersion, followed by stirring for 30 minutes. Thereafter, a predetermined amount of 1 mass % aqueous CMC solution as described above was added to the resultant mixture for regulation of the viscosity thereof, and then 40 mass % aqueous SBR dispersion (BM400B, product of Zeon Corporation) was added to the resultant mixture, followed by stirring for 15 minutes, to thereby prepare a carbonaceous negative electrode material composition.

Method C:

In a stirring-blade-equipped general-purpose mixer (T.K. HIVIS MIX, product of Tokushu Kikakogyo Co., Ltd.), at room temperature, a predetermined amount of carbonaceous negative electrode active substance powder was added to 1 mass % aqueous CMC solution (Daicel 2200, product of Daicel Chemical Industries, Ltd.) at room temperature, followed by stirring at a rotation speed of 25 rpm for 30 minutes. Subsequently, a predetermined amount of carbon fiber was added to the resultant mixture, followed by stirring for 30 minutes, to thereby disperse the carbon fiber in the mixture. Thereafter, 40 mass % aqueous SBR dispersion (BM400B, product of Zeon Corporation) was added to the resultant mixture, followed by stirring for 15 minutes, to thereby prepare a carbonaceous negative electrode material composition.

Method D:

In a high-speed table mixer equipped with blades (IKA mixer), carbonaceous negative electrode active substance powder and carbon fiber were dry-mixed in predetermined proportions at 10,000 rpm (one minute×twice). Subsequently, the resultant mixture was transferred to a stirring-blade-equipped general-purpose mixer (T.K. HIVIS MIX, product of Tokushu Kikakogyo Co., Ltd.), and a predetermined amount of 1 mass % aqueous CMC solution (Daicel 2200, product of Daicel Chemical Industries, Ltd.) was added to the mixture, followed by stirring for 30 minutes at room temperature. Thereafter, 40 mass % aqueous SBR dispersion (BM400B, product of Zeon Corporation) was added to the resultant mixture, followed by 0.20 stirring for 15 minutes, to thereby prepare a carbonaceous negative electrode material composition.

Referential Method (without Addition of Carbon Fiber):

In a stirring-blade-equipped general-purpose mixer (T.K. HIVIS MIX, product of Tokushu Kikakogyo Co., Ltd.), a predetermined amount of carbonaceous negative electrode active substance powder was added to 1 mass % aqueous CMC solution (Daicel 2200, product of Daicel Chemical Industries, Ltd.) at room temperature, followed by stirring for 30 minutes. Thereafter, 40 mass % aqueous SBR dispersion (BM400B, product of Zeon Corporation) was added to the resultant mixture, followed by stirring for 15 minutes, to thereby prepare a carbonaceous negative electrode material composition.

[5] Production and Evaluation of Electrode and Battery (1) Production of Carbonaceous Negative Electrode Sheet By use of a doctor blade, each of the above-prepared carbonaceous negative electrode material compositions was applied onto a rolled copper foil (product of Nippon Foil Mfg. Co., Ltd.) (18 μm) so as to attain a predetermined thickness. The resultant product was dried under vacuum at 120° C. for one hour, and then subjected to punching, to thereby form an electrode having a size of 18 mmφ. The thus-formed electrode was sandwiched by super-steel-made pressing plates, and then subjected to pressing such that a pressure of $1\times10^3$ to $3\times10^3$ kg/cm$^2$ was applied to the electrode, to thereby attain a thickness of about 100 μm and a target electrode density (1.6 g/cm$^3$ or 1.8 g/cm$^3$).

Thereafter; the resultant electrode was dried in a vacuum drying apparatus at 120° C. for 12 hours, and was employed as a carbonaceous negative electrode sheet for battery evaluation.

(2) Preparation of Positive Electrode Material Composition

LiCoO$_2$ (a positive electrode active substance), Acetylene Black (product of Denki Kagaku Kogyo Kabushiki Kaisha), and vapor grown graphite fiber (product of Showa Denko K.K.) were dry-mixed in proportions by mass of 93:1:2 at 10,000 rpm (one minute×twice) by use of a high-speed table mixer equipped with blades (IK mixer). To the resultant mixture, KF Polymer L1320 (N-methylpyrrolidone (NMP) solution containing 12 mass % polyvinylidene fluoride (PVDF), product of Kureha Chemical Industry Co., Ltd.) was added such that the ratio by mass of the mixture to PVDF became 96:4, and the resultant mixture was kneaded by use of a planetary mixer, to thereby prepare a positive electrode material composition.

(3) Production of Positive Electrode Sheet

NMP was further added to the positive electrode material composition so as to regulate the viscosity of the composition. Subsequently, by use of a doctor blade, the resultant composition was applied onto a rolled Al foil (product of Showa Denko K.K.) (25 μm) so as to attain a predetermined thickness. The resultant product was dried under vacuum at 120° C. for one hour, and then subjected to punching, to thereby form an electrode having a size of 18 mmφ. The thus-formed electrode was sandwiched by super-steel-made pressing plates, and then subjected to pressing such that a pressure of $1\times10^3$ kg/cm$^2$ was applied to the electrode, to thereby attain a thickness of about 100 μm and an electrode density of 3.3 g/cm$^3$.

Thereafter, the resultant electrode was dried in a vacuum drying apparatus at 120° C. for 12 hours, and was employed for evaluation.

(4) Evaluation of Permeation Rate of Electrolytic Solution

Propylene carbonate (abbreviated as "PC") (3 μl) serving as an electrolytic solution, which exhibits a viscosity almost equal to that of each electrolytic solution and has low volatility, was added dropwise to each negative electrode sheet (18 mmφ) in air at 25° C. by use of a microsyringe, and the time required for PC to permeate the electrode sheet was measured. Measurement of the permeation time was performed three times, and the average of the thus-obtained values was employed for evaluation.

(5) Measurement of Specific Resistance of Electrode

The volume resistivity (25° C.) of each negative electrode sheet was measured by means of the four-probe method.

(6) Production of Lithium Ion Cell for Testing

A three-electrode cell was produced through the below-described procedure in an atmosphere of dried argon having a dew point of −80° C. or lower.

In a polypropylene-made cell (inner diameter: about 18 mm) having a screw cap, a separator (polypropylene-made microporous film (Celgard 2400), 25 μm) was sandwiched by the copper-foil-coated negative electrode sheet prepared above in (1) and the Al-foil-coated positive electrode sheet prepared above in (3), to thereby form a laminate. Subsequently, a metallic lithium foil (50 μm) serving as a reference electrode was laminated in a manner similar to that described above. Thereafter, an electrolytic solution was added to the cell, and the resultant cell was employed for testing.

(7) Electrolytic Solution

EC type: The electrolytic solution was prepared by dissolving LiPF$_6$ (1 mol/liter), serving as an electrolyte, in a mixture of EC (ethylene carbonate) (8 parts by mass) and DEC (diethyl carbonate) (12 parts by mass).

(8) Charging/Discharging Cycle Test

Constant-current constant-voltage charging/discharging test was performed at a current density of 0.6 mA/cm$^2$ (corresponding to 0.3 C).

Constant-current (CC) charging was performed at 0.6 mA/cm$^2$ while voltage was increased from rest potential to 4.2 V. Subsequently, constant-voltage (CV) charging was performed at 4.2 V, and charging was stopped when the current value decreased to 25.4 μA.

CC discharging was performed at 0.6 mA/cm$^2$ (corresponding to 0.3 C), and was cut off when a voltage of 2.7 V was attained.

Materials Employed

<Negative Electrode Active Substance>

SCMG-1: spherical graphite particles (product of Showa Denko K.K.)
    average particle size: 24.5 μm
    average roundness: 0.93
    X-ray $C_0$: 0.6716 nm
    Lc: 459 nm
    Raman R value: 0.05
    specific surface area: 1.2 m$^2$/g
    true density: 2.17 g/cm$^3$ SCMG-2: spherical graphite particles (product of Showa Denko K.K.)
    average particle size: 19.0 μm
    average roundness: 0.91
    X-ray $C_0$: 0.6716 nm
    Lc: 489 nm
    Raman R value: 0.06
    specific surface area: 2.5 m$^2$/g
    true density: 2.17 g/cm$^3$ MAG: graphite particles (product of Hitachi Chemical Co., Ltd.)
    average particle size: 20.1 μm
    average roundness: 0.85
    X-ray $C_0$: 0.6716 nm
    Lc: 420 nm
    Raman R value: 0.10
    specific surface area: 3.2 m$^2$/g
    true density: 2.20 g/cm$^2$ Shanghai MC: mesophase graphite particles (product of Shanghai Shanshan Technology Co., Ltd.)
    average particle size: 17.4 μm
    average roundness: 0.88

X-ray $C_0$: 0.6732 nm
Lc: 82.0 nm
Raman R value: 0.15
specific surface area: 1.3 m²/g
true density: 2.15 g/cm³
MCMB: mesophase spherical graphite particles (product of Osaka Gas Chemicals Co., Ltd.)
    average particle size: 16.6 μm
    average roundness: 0.94
    X-ray $C_0$: 0.6729 nm
    Lc: 84.4 nm
    Raman R value: 0.12
    specific surface area: 1.1 m²/g
    true density: 2.19 g/cm²
LBCG: spherical natural graphite (product of Nippon Graphite Industries Co., Ltd.)
    average particle size: 24.0 μm
    average roundness: 0.85
    X-ray $C_0$: 0.6717 nm
    Lc: 283.5 nm
    Raman R value: 0.23
    specific surface area: 4.6 m²/g
    true density: 2.27 g/cm²
<Positive Electrode Active Substance>
$LiCoO_2$: product of Nippon Chemical Industrial Co., Ltd.
    average particle size: 28.9 μm
    average roundness: 0.96
<Carbon Fiber>
VG: vapor grown graphite fiber
    average fiber diameter (determined by SEM image analysis): 150 nm
    average fiber length (determined by SEM image analysis): 8 μm
    average aspect ratio: 60
    branching degree (determined by SEM image analysis): 0.1%
    X-ray $C_0$: 0.6767 nm
    Lc: 48.0 nm
VG-A: vapor grown carbon fiber (non-graphitized, fired at 1,200° C.)
    average fiber diameter (determined by SEM image analysis): 150 nm
    average fiber length (determined by SEM image analysis): 8 μm
    average aspect ratio: 65
    branching degree (determined by SEM image analysis): 0.1%
    X-ray $C_0$: 0.6992 nm
    Lc: 3.0 nm
VG-B: vapor grown graphite fiber (addition of 2% boron during graphitization)
    average fiber diameter (determined by SEM image analysis): 150 nm
    average fiber length (determined by SEM image analysis): 8 μm
    average aspect ratio: 60
    branching degree (determined by SEM image analysis): 0.1%
    X-ray $C_0$: 0.6757 nm
    Lc: 72.0 nm
VG-H: vapor grown graphite fiber (milled by use of a jet mill)
    average fiber diameter (determined by SEM image analysis): 150 nm
    average fiber length (determined by SEM image analysis): 5 μm
    average aspect ratio: 37
    branching degree (determined by SEM image analysis): 0.1%
    X-ray $C_0$: 0.6769 nm
    Lc: 47.0 nm
VG-O: vapor grown graphite fiber (oxidized at 500° C.) average fiber diameter (determined by SEM image analysis): 150 nm
    average fiber length (determined by SEM-image analysis): 8 μm
    average aspect ratio: 55
    branching degree (determined by SEM image analysis): 0.1%
    X-ray $C_0$: 0.6769 nm
    Lc: 42.0 nm
VG-F: vapor grown graphite fiber
    average fiber diameter (determined by SEM image analysis): 80 nm
    average fiber length (determined by SEM image analysis): 6 μm
    average aspect ratio: 90
    branching degree (determined by SEM image analysis): 0.1%
    X-ray $C_0$: 0.6801 nm
    Lc: 35.0 nm
VG-T: vapor grown graphite fiber
    average fiber diameter (determined by SEM image analysis): 20 nm
    average fiber length (determined by SEM image analysis): 6 μm
    average aspect ratio: 150
    branching degree (determined by SEM image analysis): 0.1%
    X-ray $C_0$: 0.6898 nm
    Lc: 30.0 nm
<SBR Electrode Binder>
BM-400B: 40 mass % aqueous dispersion (product of Zeon Corporation)
    glass transition temperature: −5° C. (determined by DSC)
    average particle size: 120 nm

EXAMPLES

Production and Evaluation of Negative Electrode and Battery

Carbonaceous negative electrodes were prepared from compositions shown in Table 1 (negative electrode density: 1.6 g/cm³ in Table 1-1 and 1.8 g/cm³ in Table 1-2) by means of methods shown in Table 1. Each of the thus-prepared negative electrodes was subjected to measurement of specific resistance and electrolytic solution permeation rate. Subsequently, a Li ion cell for testing was produced using each negative electrode in combination with the above-prepared positive electrode, and the thus-produced cell was subjected to measurement and evaluation in terms of negative electrode capacity density and (charging/discharging) cycle characteristics.

The results are shown in Table 1.

As is apparent from Table 1, a negative electrode produced from a negative electrode material composition prepared by means of any of the methods (A) through (D), (A-2), and (A-3) exhibits improved electrolytic solution permeability as compared with the case of a negative electrode produced from a negative electrode material composition containing no carbon fiber, and a battery produced by use of the former negative electrode exhibits improved cycle characteristics. Particularly, a negative electrode produced from a negative electrode material composition prepared by means of any of the methods (A) through (D) exhibits improved specific resistance, electrolytic solution permeability, and capacity density, and a battery produced by use of the negative electrode exhibits considerably improved cycle characteristics. The results show that the effects of the method are the most significant in (A) as well as in (B), the second in (C), and the third in (D).

TABLE 1-1

Electrode density: 1.6 g/cm³

| Negative electrode (preparation method for negative electrode material composition) | Composition of negative electrode | | | Physical properties of negative electrode and battery | | | |
|---|---|---|---|---|---|---|---|
| | Active substance | Carbon fiber | Proportions by mass: active substance/ carbon fiber/SBR/ CMC | Specific resistance of electrode (Ωcm) | Permeation rate (sec) | Negative electrode capacity density *1 | Cycle characteristics *2 |
| SCMG-1 (BET specific surface area: 1.2 m²/g, average particle size: 24.5 μm) | | | | | | | |
| SCMG1re-1 (ref)*3 | SCMG-1 | None | 98/0/1/1 | 0.17 | 250 | 315.0 | 210 |
| SCVC1-1 (A) | SCMG-1 | VG | 96/2/1/1 | 0.08 | 150 | 320.8 | 380 |
| SCMG-2 (BET specific surface area: 2.5 m²/g, average particle size: 19.0 μm) | | | | | | | |
| SCMG2re-1 (ref) | SCMG-2 | None | 98/0/1/1 | 0.12 | 200 | 320.2 | 226 |
| SCVC2-1 (A) | SCMG-2 | VG | 96/2/1/1 | 0.06 | 120 | 323.2 | 380 |
| MAG (BET specific surface area: 3.2 m²/g, average particle size: 20.1 μm) | | | | | | | |
| MAGre-1 (ref) | MAG | None | 98/0/1/1 | 0.23 | 330 | 320.0 | 176 |
| MAVC-1 (A) | MAG | VG | 96/2/1/1 | 0.12 | 180 | 323.7 | 330 |
| LBCG (BET specific surface area: 4.6 m²/g, average particle size: 24.0 μm) | | | | | | | |
| LBCGre-1 (ref) | LBCG | None | 98/0/1/1 | 0.40 | 400 | 300.3 | 86 |
| LBVC-1 (B) | MAG | VG | 96/2/1/1 | 0.23 | 250 | 303.7 | 156 |
| Shanghai MC (BET specific surface area: 1.3 m²/g, average particle size: 17.4 μm) | | | | | | | |
| Shang MCre-1 | Shanghai MC | None | 98/0/1/1 | 0.62 | 150 | 270.3 | 150 |
| Shang VC1-1 (A) | Shanghai MC | VG | 96/2/1/1 | 0.35 | 100 | 275.8 | 280 |
| Shang VC2-1 (A) | Shanghai MC | VG | 93/5/1/1 | 0.25 | 80 | 275.3 | 380 |
| Shang VCA-1 (A) | Shanghai MC | VG-A | 96/2/1/1 | 0.38 | 80 | 272.0 | 200 |
| Shang VCB-1 (A) | Shanghai MC | VG-B | 96/2/1/1 | 0.30 | 100 | 275.8 | 335 |
| Shang VCH-1 (A) | Shanghai MC | VG-H | 96/2/1/1 | 0.38 | 120 | 272.1 | 295 |
| Shang VCO-1 (A) | Shanghai MC | VG-O | 96/2/1/1 | 0.32 | 80 | 265.3 | 330 |
| Shang VN-1 (A) | Shanghai MC | VG-F | 96/2/1/1 | 0.28 | 90 | 278.2 | 325 |
| Shang VT-1 (A) | Shanghai MC | VG-T | 96/2/1/1 | 0.29 | 110 | 274.8 | 275 |
| MCMB (BET specific surface area: 1.1 m²/g, average particle size: 16.6 μm) | | | | | | | |
| MCMBre-1 (ref) | MCMB | None | 98/0/1/1 | 0.63 | 140 | 303.5 | 153 |
| MCVC-1 (A) | MCMB | VG | 96/2/1/1 | 0.37 | 110 | 303.2 | 285 |

*1: mAh/g (battery discharge capacity/negative electrode volume)
*2: Cycle number at 80% or more of the maximum capacity
*3(ref) refers to "Referential Method".

TABLE 1-2

Electrode density: 1.8 g/cm³

| Negative electrode (preparation method for negative electrode material composition) | Composition of negative electrode | | | Physical properties of negative electrode and battery | | | |
|---|---|---|---|---|---|---|---|
| | Active substance | Carbon fiber | Proportions by mass: active substance/ carbon fiber/ SBR/CMC | Specific resistance of electrode (Ωcm) | Permeation rate (sec) | Negative electrode capacity density *1 | Cycle characteristics *2 |
| SCMG-1 (BET specific surface area: 1.2 m²/g, average particle size: 24.5 μm) | | | | | | | |
| SCMG1re-2 (ref)*3 | SCMG-2 | None | 98/0/1/1 | 0.15 | 1000 | 280.3 | 185 |
| SCVC1-2 (A) | SCMG-1 | VG | 96/2/1/1 | 0.07 | 420 | 320.6 | 370 |
| SCMG-2 (BET specific surface area: 2.5 m²/g, average particle size: 19.0 μm) | | | | | | | |
| SCMG2re-2 (ref) | SCMG-2 | None | 98/0/1/1 | 0.10 | 820 | 276.0 | 205 |
| SCVC2-2 (A) | SCMG-2 | VG | 96/2/1/1 | 0.05 | 330 | 322.0 | 405 |
| SCVC2-2 (A-3) | SCMG-2 | VG | 96/2/1/1 | 0.11 | 750 | 320.0 | 385 |

TABLE 1-2-continued

Electrode density: 1.8 g/cm³

| Negative electrode (preparation method for negative electrode material composition) | Composition of negative electrode | | | Physical properties of negative electrode and battery | | | |
|---|---|---|---|---|---|---|---|
| | Active substance | Carbon fiber | Proportions by mass: active substance/ carbon fiber/ SBR/CMC | Specific resistance of electrode (Ωcm) | Permeation rate (sec) | Negative electrode capacity density *1 | Cycle characteristics *2 |
| SCVC2-2 (B) | SCMG-2 | VG | 96/2/1/1 | 0.05 | 330 | 315.0 | 320 |
| SCVC2-2 (C) | SCMG-2 | VG | 96/2/1/1 | 0.08 | 500 | 310.0 | 308 |
| MAG (BET specific surface area: 3.2 m²/g, average particle size: 20.1 μm) | | | | | | | |
| MAGre-2 (ref) | MAG | None | 98/0/1/1 | 0.21 | 1200 | 290.3 | 133 |
| MAVC-2 (A) | MAG | VG | 96/2/1/1 | 0.10 | 710 | 320.3 | 270 |
| LBCG (BET specific surface area: 4.6 m²/g, average particle size: 24.0 μm) | | | | | | | |
| LBCGre-2 (ref) | LBCG | None | 98/0/1/1 | 0.35 | 1500 | 250.2 | 43 |
| LBVC-2 (B) | MAG | VG | 96/2/1/1 | 0.21 | 800 | 299.2 | 115 |
| Shanghai MC (BET specific surface area: 1.3 m²/g, average particle size: 17.4 μm) | | | | | | | |
| Shang MCre-2 | Shanghai MC | None | 98/0/1/1 | 0.60 | 1050 | 265.5 | 95 |
| Shang VC1-2 (A) | Shanghai MC | VG | 96/2/1/1 | 0.33 | 380 | 273.5 | 283 |
| Shang VC2-2 (A) | Shanghai MC | VG | 93/5/1/1 | 0.23 | 210 | 275.6 | 375 |
| Shang VC2-2 (A-2) | Shanghai MC | VG | 93/5/1/1 | 0.51 | 720 | 270.3 | 151 |
| Shang VC2-2 (A-3) | Shanghai MC | VG | 93/5/1/1 | 0.55 | 830 | 260.2 | 128 |
| Shang VC2-2 (B) | Shanghai MC | VG | 93/5/1/1 | 0.23 | 200 | 275.3 | 350 |
| Shang VC2-2 (C) | Shanghai MC | VG | 93/5/1/1 | 0.33 | 320 | 275.3 | 320 |
| Shang VC2-2 (D) | Shanghai MC | VG | 93/5/1/1 | 0.36 | 350 | 270.3 | 300 |
| Shang VCA-2 (A) | Shanghai MC | VG-A | 96/2/1/1 | 0.36 | 350 | 271.2 | 210 |
| Shang VCB-2 (A) | Shanghai MC | VG-B | 96/2/1/1 | 0.28 | 350 | 274.5 | 353 |
| Shang VCH-2 (A) | Shanghai MC | VG-H | 96/2/1/1 | 0.36 | 410 | 270.6 | 305 |
| Shang VCO-2 (A) | Shanghai MC | VG-O | 96/2/1/1 | 0.30 | 300 | 268.4 | 335 |
| Shang VN-2 (A) | Shanghai MC | VG-F | 96/2/1/1 | 0.26 | 270 | 276.8 | 330 |
| Shang VT-2 (A) | Shanghai MC | VG-T | 96/2/1/1 | 0.27 | 380 | 268.0 | 263 |
| MCMB (BET specific surface area: 1.1 m²/g, average particle size: 16.6 μm) | | | | | | | |
| MCMBre-2 (ref) | MCMB | None | 98/0/1/1 | 0.61 | 1000 | 283.2 | 120 |
| MCVC-2 (A) | MCMB | VG | 96/2/1/1 | 0.33 | 370 | 300.2 | 288 |

*1: mAh/g (battery discharge capacity/negative electrode volume)
*2: Cycle number at 80% or more of the maximum capacity
*3(ref) refers to "Referential Method".

INDUSTRIAL APPLICABILITY

The negative electrode material for a lithium battery of the present invention contains SBR as a binder, and carbon fiber having a fiber diameter of 1 to 1,000 nm, highly dispersed in the binder and serving as an electrically conductive additive. The negative electrode material enables to produce a battery having excellent characteristics; i.e., low electrode resistance, high electrode strength, excellent electrolytic solution permeability, high energy density, and good high-speed charging/discharging performance.

The invention claimed is:

1. A method for producing a composition for forming a negative electrode material for a lithium battery, comprising adding an aqueous styrene-butadiene rubber dispersion to a carbon fiber/active substance dispersion prepared by dispersing, in an aqueous thickener solution, a carbon fiber having a fiber diameter of 1 to 1,000 nm, a carbonaceous negative electrode active substance having a specific surface area of 1 m²/g or more; and stifling the resultant mixture, wherein the carbon fiber/active substance dispersion is prepared by (1) dispersing a carbon fiber having a fiber diameter of 1 to 1,000 nm in an aqueous thickener solution under stifling; and by adding thereto a carbonaceous negative electrode active substance having a specific surface area of 1 m²/g or more followed by mixing with stirring, or (2) adding, to an aqueous thickener solution, a carbonaceous negative electrode active substance having a specific surface area of 1 m²/g or more followed by mixing with stirring; and by dispersing a carbon fiber having a fiber diameter of 1 to 1,000 nm in the resultant mixture under stirring.

2. The method for producing a composition for forming a negative electrode material for a lithium battery as claimed in claim 1, wherein the carbon fiber/active substance dispersion is prepared by step (1) and further by being regulated using an aqueous thickener solution.

3. The method for producing a composition for forming a negative electrode material for a lithium battery as claimed in claim 1, wherein the content of the thickener in the aqueous thickener solution is 0.3 to 5 mass %, and the content of the styrene-butadiene rubber in the aqueous styrene-butadiene rubber dispersion is 10 to 60 mass %.

4. The method for producing a composition for forming a negative electrode material for a lithium battery as claimed in claim 1, wherein the thickener is carboxymethyl cellulose.

* * * * *